United States Patent
Grundon

(10) Patent No.: US 7,338,301 B2
(45) Date of Patent: Mar. 4, 2008

(54) DESK ATTACHMENT

(75) Inventor: Keith Grundon, Chudleigh (GB)

(73) Assignee: Amulet Electronics Limited (GB)

( * ) Notice: Subject to any disclaimer, the term of this patent is extended or adjusted under 35 U.S.C. 154(b) by 0 days.

(21) Appl. No.: 10/517,175

(22) PCT Filed: Jun. 13, 2003

(86) PCT No.: PCT/GB03/02536

§ 371 (c)(1),
(2), (4) Date: Dec. 7, 2004

(87) PCT Pub. No.: WO03/107159

PCT Pub. Date: Dec. 24, 2003

(65) Prior Publication Data

US 2006/0063424 A1    Mar. 23, 2006

(30) Foreign Application Priority Data

Jun. 13, 2002  (GB) .................................. 0213547.3

(51) Int. Cl.
*H01R 4/60* (2006.01)
(52) U.S. Cl. ..................................... 439/214; 439/929
(58) Field of Classification Search ................ 439/638, 439/535, 577, 929, 540.1, 214
See application file for complete search history.

(56) References Cited

U.S. PATENT DOCUMENTS

| | | | |
|---|---|---|---|
| 5,272,277 A * | 12/1993 | Humbles et al. ............... | 174/48 |
| 5,516,298 A * | 5/1996 | Smith .......................... | 439/131 |
| 5,655,822 A * | 8/1997 | Roberts et al. ............. | 312/194 |
| 5,967,820 A * | 10/1999 | Siegal et al. ................. | 439/214 |
| 6,169,655 B1 * | 1/2001 | Helot .......................... | 361/686 |
| 6,327,983 B1 * | 12/2001 | Cronk et al. ............. | 108/50.02 |
| 6,379,182 B1 * | 4/2002 | Byrne ........................ | 439/574 |
| 6,880,982 B2 * | 4/2005 | Imamura ..................... | 385/88 |
| 2003/0186582 A1* | 10/2003 | Laukhuf et al. ............ | 439/535 |
| 2005/0233622 A1* | 10/2005 | Lichtscheidl et al. ....... | 439/131 |

FOREIGN PATENT DOCUMENTS

| | | | |
|---|---|---|---|
| DE | 4115151 A1 | * | 11/1992 |
| EP | 0806069 | | 11/2001 |
| EP | 1217919 B1 | * | 5/2003 |
| WO | WO 200122848 A2 | * | 4/2001 |

OTHER PUBLICATIONS

International Search Report, Jan. 26, 2004.

* cited by examiner

*Primary Examiner*—Tulsidas C. Patel
*Assistant Examiner*—Vladiimir Imas
(74) *Attorney, Agent, or Firm*—Ira S Dorman

(57) ABSTRACT

A desk attachment includes a base unit 1 including a communication bus having a communication port for connection to at least one remote signal source. A plurality of user modules 20 are provided for attachment to the base unit such that they are electrically connected with the bus. Each module has a PC port 22 for connection with a local computer and at least one peripheral port 23 for connection with a user interface device. The ports are arranged such that a computer on the PC port is operably connected to the or each peripheral port and the bus.

7 Claims, 1 Drawing Sheet

DESK ATTACHMENT

TECHNICAL FIELD OF THE INVENTION

This invention relates to a desk attachment for managing the cabling infrastructure associated with a computer system.

BACKGROUND

In dealing rooms trading in commodities or stocks and shares a typical dealing desk may be associated with several computers which are each connected to desktop user interface devices such as keyboards, mice and monitors as well as being linked to remote data sources to receive information by analogue or digital video, audio etc. In order to simplify the complex interconnections between the numerous cables it has been proposed to provide each desk with electronic management hub known as a SmartLoom (Amulet registered trade mark) which actively manages the interconnections between the various devices. For convenience, the computers may be mounted on a trolley each coupled to the hub device via a special mass connector, allowing them to be relocated to another desk with minimum effort.

The present invention seeks to provide a new and inventive form of cable management system which offers an entry-level system of lower complexity than the SmartLoom system whilst at the same time offering a simple and flexible upgrade path which allows complex installations to be managed just as effectively as the existing system.

SUMMARY OF THE INVENTION

The present invention provides a desk attachment which includes:
- a base unit including a communication bus having a communication port for connection to at least one remote signal source; and
- a plurality of user modules for attachment to the base unit such that they are electrically connected with the bus, each module having a PC port for connection with a local computer and at least one peripheral port for connection with a user interface device, said ports being arranged such that a computer on the PC port is operably connected to the or each peripheral port and the bus.

BRIEF DESCRIPTION OF THE DRAWINGS

The following description and the accompanying drawings referred to therein are included by way of non-limiting example in order to illustrate how the invention may be put into practice. In the drawings.

DETAILED DESCRIPTION OF THE DRAWINGS

Figure 1:
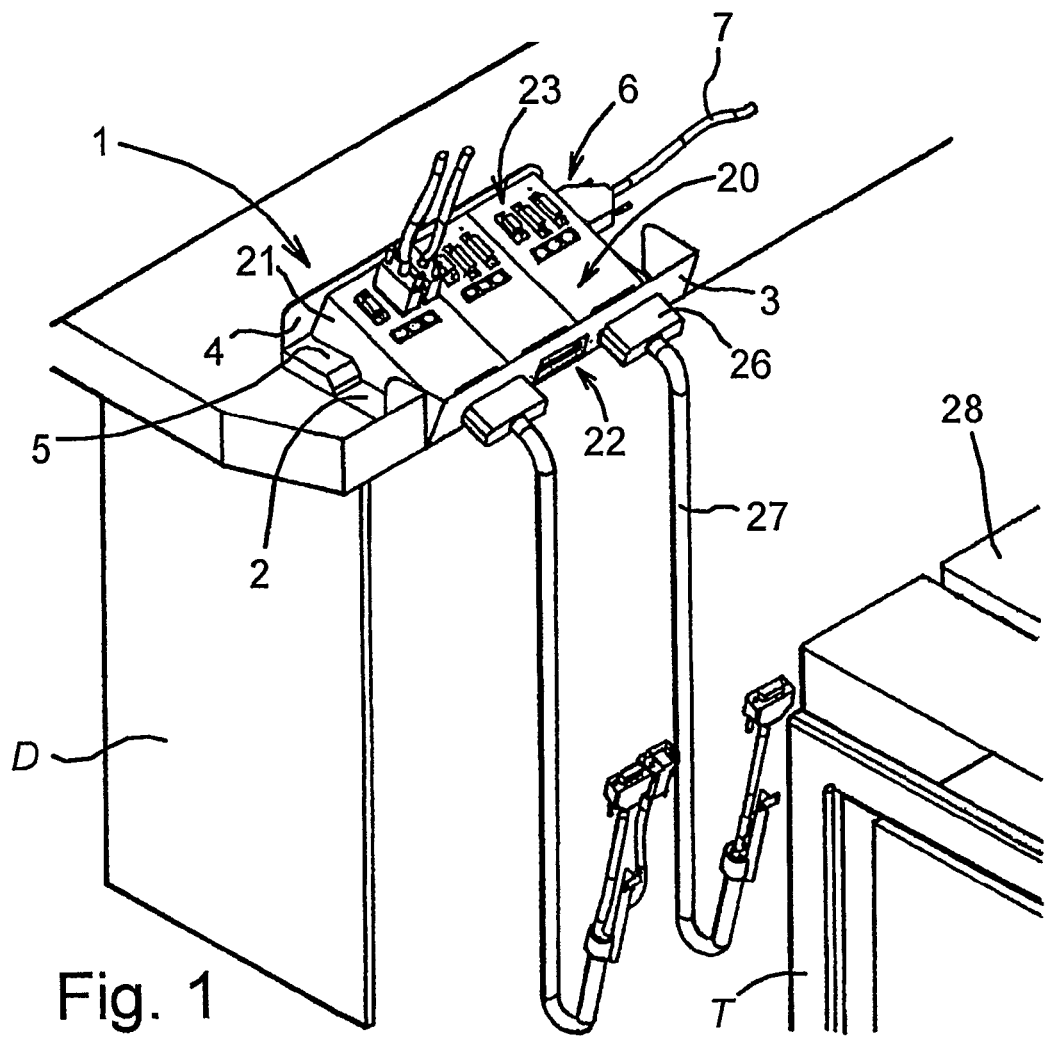
FIG. 1 is a general view of a cable management device attached to a desk in accordance with the invention.
Figure 2:
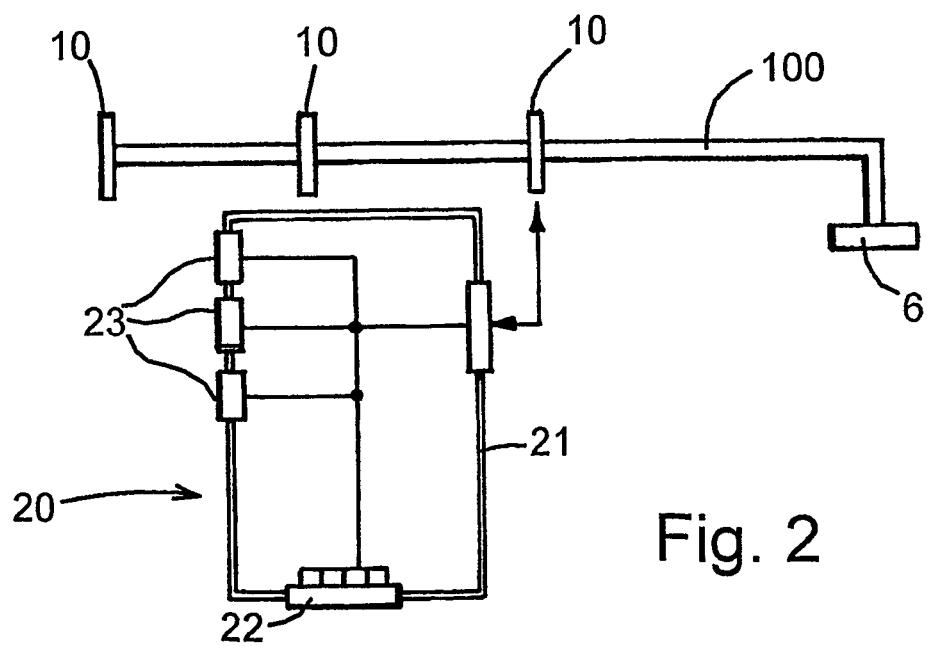
FIG. 2 is a schematic diagram of the device including detail of a single user module.

The cable management device which is shown in the drawings includes a channel-shaped chassis 1 forming a base unit which can be attached to a dealing desk D in the area of the cable tray by means of screws or bolts, although other mounting positions and means of attachment are possible. The chassis may be formed inexpensively from sheet metal and includes a base wall 2 with upstanding front and rear walls 3 and 4. A duct 5 is formed at the junction between the base and rear walls 2 and 4 to contain a multi-wire bus 100 (FIG. 2). The bus may typically carry multiple signal channels and an optional power bus and is provided with a multi-way connector 6 at one end of the channel 5 for connection via an umbilical cable 7 to a remote user pod (not shown). By way of example, the signals carried to and from the user pod may include analogue and/or digital video, audio (mono or stereo) and data sent via USB, RS232 or other serial signalling protocols, parallel data, local network protocols etc. Access to the bus is provided via a plurality of bus connectors 10 (FIG. 2), typically three or four, which are mounted in spaced positions along the duct 5 such that a bank of identical user modules 20 can be mounted in the chassis each connected to a respective bus connector 10.

Each user module 20 includes a housing 21 which positively locates within the chassis 1. Each module has a PC port 22 and a number of peripheral ports 23 are mounted on the exposed upper face of the module. The PC port 22 is aligned with an aperture in the front wall 3 of the chassis 1 to receive a mass connector 26 which leads via a cable 27 to a workstation computer 28. A number of such computers (typically up to four) can be mounted on a trolley T beneath the desk D. Desktop peripheral user devices can be plugged into the appropriate ports 23, e.g. PS/2 keyboard and mouse, DVI video monitor, speakers etc.

As indicated in FIG. 2, the user module provides the necessary internal connections between the PC port 22, the peripheral devices and the bus 100. In a basic entry-level system the connections may be passive, although more complex forms of the device may incorporate electronic modules to provide active signal handling.

The modules 20 can be added or removed as required according to the number of computers being used.

It will thus be appreciated that the device provides a low cost flexible modular system which is easily adapted to accommodate future developments in technology. Installation is simple and the system is easily reconfigurable whilst providing a highly reliable and effective cable management solution.

Although the example of a dealing room is specifically described herein it will be appreciated that the cable management system can be used in any situation where two or more computer workstations are used in close proximity connected to a remote location.

It will be appreciated that the features disclosed herein may be present in any feasible combination. Whilst the above description lays emphasis on those areas which, in combination, are believed to be new, protection is claimed for any inventive combination of the features disclosed herein.

The invention claimed is:

1. A cable management system which includes:
   a desk;
   a user module mounted on the desk and including a plurality of peripheral port connectors for connection to respective desktop user interface devices;
   a workstation computer;
   a single cable linking the workstation computer to the user module to provide all connections between the peripheral port connectors and the workstation computer; and
   a releasable mass connector coupled to said single cable and arranged to effect said connections between the peripheral port connectors and the workstation computer, such that the workstation computer can be disconnected from all of the peripheral port connectors simultaneously by releasing the mass connector.

2. A cable management system according to claim 1 in which the workstation computer is mounted beneath the desk on a trolley.

3. A cable management system according to claim 1 in which the user module is releasably engaged with a base unit which is attached to the desk.

4. A cable management system according to claim 3 in which the base unit includes a communication bus having a communication port for connection of the bus to at least one remote signal source.

5. A cable management system according to claim 4 in which the base unit includes a bus connector for connection with said user module such that the workstation computer which is coupled to said user module is operably connected to the bus via the respective bus connector.

6. A cable management system according to claim 5 in which the base unit includes a plurality of bus connectors for connection with a plurality of such user modules.

7. A cable management unit for use with a desk and a workstation computer, which includes:

a user module adapted to be mounted on the desk and including a plurality of peripheral port connectors for connection to respective desktop user interface devices;

a single cable for connection to the workstation computer and the user module to provide all connections between the peripheral port connectors and the workstation computer; and a releasable mass connector coupled to said single cable and arranged to effect said connections between the peripheral port connectors and the workstation computer, such that the workstation computer can be disconnected from all of the peripheral port connectors simultaneously by releasing the mass connector.

* * * * *